United States Patent
Matsui

(10) Patent No.: US 10,089,048 B2
(45) Date of Patent: Oct. 2, 2018

(54) PRINTING MANAGING APPARATUS AND COMPUTER READABLE MEDIUM STORING PRINTING MANAGING PROGRAM FOR CONTROLLING DISPLAY ORDER OF PRINTERS

(71) Applicant: FUJI XEROX CO., LTD., Tokyo (JP)

(72) Inventor: Takao Matsui, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/475,959

(22) Filed: Mar. 31, 2017

(65) Prior Publication Data

US 2018/0113659 A1    Apr. 26, 2018

(30) Foreign Application Priority Data

Oct. 21, 2016  (JP) .................................. 2016-207138

(51) Int. Cl.
*G06F 3/12*    (2006.01)
*G06F 3/0482*  (2013.01)

(52) U.S. Cl.
CPC .......... *G06F 3/1256* (2013.01); *G06F 3/0482* (2013.01); *G06F 3/1204* (2013.01); *G06F 3/1205* (2013.01); *G06F 3/1226* (2013.01); *G06F 3/1231* (2013.01); *G06F 3/1273* (2013.01); *G06F 3/1288* (2013.01)

(58) Field of Classification Search
None
See application file for complete search history.

(56) References Cited

U.S. PATENT DOCUMENTS

| 2003/0231328 | A1  | 12/2003 | Chapin et al. |
| 2008/0184162 | A1* | 7/2008  | Lindsey ................ G06F 3/1204 715/783 |
| 2012/0218596 | A1* | 8/2012  | Hashimoto ........... G06F 3/1207 358/1.15 |

FOREIGN PATENT DOCUMENTS

| JP | 2006-301860 A | 11/2006 |
| JP | 2016-177787 A | 10/2016 |

OTHER PUBLICATIONS

Oct. 25, 2017 Search Report issued in European Patent Application No. 17168638.9.

* cited by examiner

*Primary Examiner* — Andrew H Lam
(74) *Attorney, Agent, or Firm* — Oliff PLC

(57) ABSTRACT

A printing managing apparatus has: a memory that stores pieces of setting information of respective print jobs and pieces of information relating to respective printers; a display control unit that causes a display to display, simultaneously, a print job list that is a list of print jobs and a printer list that is a list of printers; and a receiving unit that receives an input to the print job list displayed on the display, and: if the receiving unit receives an input for selecting a print job that is displayed in the print job list, the display control unit changes the display order of the printers in the printer list using the setting information of the selected print job and the pieces of information relating to the respective printers; and the receiving unit receives an input for selecting a printer as defined herein.

10 Claims, 8 Drawing Sheets

JOB EDITING  [←PRECEDING JOB]  [NEXT JOB→]

- JOB ID: 6
- JOB NAME: 
- NUMBER OF COPIES: 1
- TRANSMISSION DESTINATION: BB01
- LOGICAL PRINTER: LP-C
- SHEETS: A4_WHITE_PLAIN
- PROFILES: ☑ CMYK COLOR CORRECTION
  - ● DEVICE PROFILE
    - DEPENDS ON PRINTER SETTING
    - OUTPUT PROFILE
    - STANDARD PROFILE
  - ○ CMYK INPUT PROFILE
    - OUTPUT PROFILE
  - ☐ CMYK SOURCE BURYING
- EJECTION DESTINATION: Tray1
- SENDER NAME: JOB MANAGEMENT OPTION
- DATE OF DELIVERY: 7/20

[CANCEL] [APPLY] [STORE]

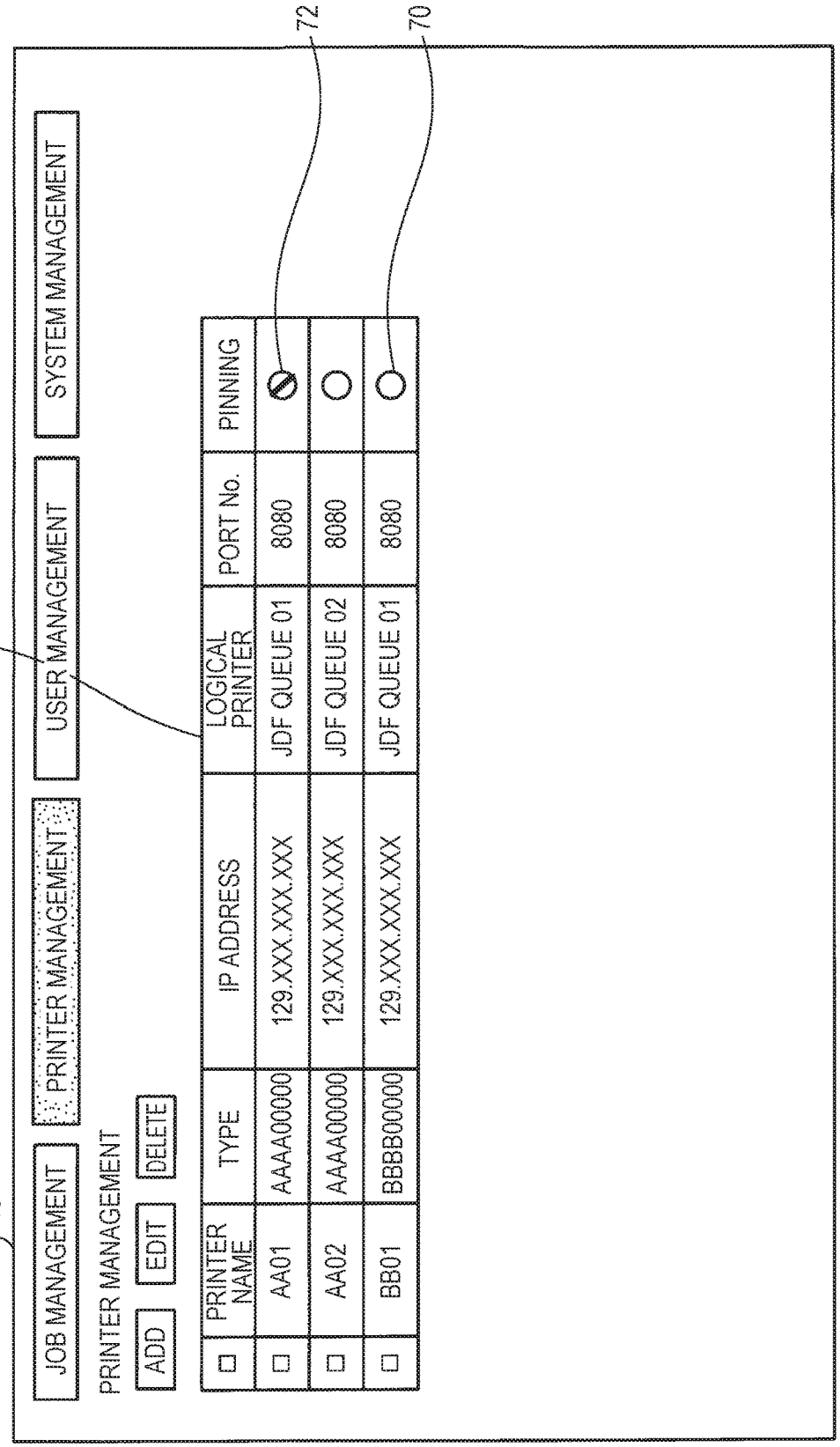

PRINTING MANAGING APPARATUS AND COMPUTER READABLE MEDIUM STORING PRINTING MANAGING PROGRAM FOR CONTROLLING DISPLAY ORDER OF PRINTERS

CROSS-REFERENCE TO RELATED APPLICATIONS

This application is based on and claims priority under 35 USC 119 from Japanese Patent Application No. 2016-207138 filed on Oct. 21, 2017.

BACKGROUND

1. Technical Field

The present invention relates to a printing managing apparatus and a computer readable medium storing a printing managing program.

2. Related Art

There may occur a case that print job data is sent to a printer that is selected from plural printers and printing is performed by the selected printer.

SUMMARY

According to an aspect of the invention, there is provided a printing managing apparatus having: a memory that stores pieces of setting information of respective print jobs and pieces of information relating to respective printers; a display control unit that causes a display to display, simultaneously, a print job list that is a list of print jobs and a printer list that is a list of printers; and a receiving unit that receives an input to the print job list displayed on the display, wherein: if the receiving unit receives an input for selecting a print job that is displayed in the print job list, the display control unit changes the display order of the printers in the printer list using the setting information of the selected print job and the pieces of information relating to the respective printers; and the receiving unit receives an input for selecting a printer as a transmission destination of data of a print job through a picture that is displayed on the display and reflects the change of the display order.

BRIEF DESCRIPTION OF THE DRAWINGS

Exemplary embodiments of the present invention will be described in detail based on the following figures, wherein:

FIG. 4 shows an example management picture;

FIG. 7 shows an example print job edit picture;

FIG. 9 shows an example printer management picture.

DESCRIPTION OF SYMBOLS

10: Job managing apparatus; 12A, 12B, 12N: Printer; 14: Terminal apparatus; 18: Printer managing unit; 20: Job managing unit; 22: UI providing unit; 24: Priority determining unit; 26: Job editing unit.

DETAILED DESCRIPTION

Figure 1:
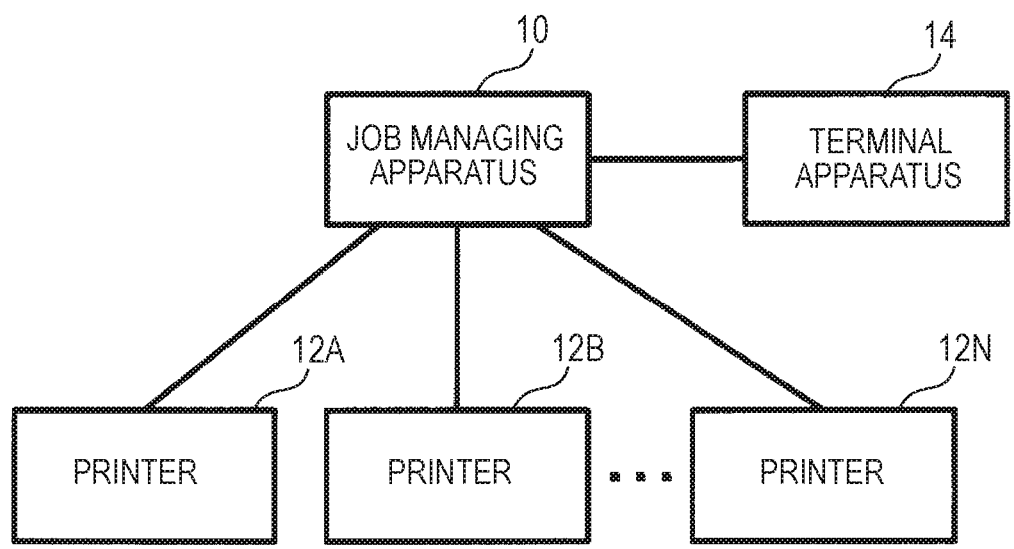
FIG. 1 is a block diagram of an example printing system according to an exemplary embodiment of the present invention.

FIG. 1 shows an example printing system according to an exemplary embodiment of the present invention. This printing system includes a job managing apparatus 10 which is a printing managing apparatus, plural printers (e.g., printers 12A, 12B, . . . , 12N), and a terminal apparatus 14. In the following description, the printers 12A, 12B, . . . , 12N will be referred to as "printers 12" if it is not necessary to discriminate between them.

Each apparatus has a function of communicating with the other apparatus. The job managing apparatus 10 and each printer 12 have a function of communicating with each other over a communication path such as a LAN (local area network) or the Internet. The job managing apparatus 10 and the terminal apparatus 14 have a function of communicating with each other over a communication path such as a LAN or the Internet.

The job managing apparatus 10 is an apparatus which receives print job data from external apparatus such as personal computers (PCs) and workstations and manages print jobs. The job managing apparatus 10 also manages the individual printers 12. For example, the job managing apparatus 10 temporarily stores (spools) print job data transmitted from an external apparatus and sends the print job data to a printer 12 selected from the plural printers 12. The job managing apparatus 10 has a function of generating management picture data (e.g., management user interface (UI) data) indicating a print job list (i.e., a list of print jobs) and a printer list (i.e., a list of the printers 12) and providing the management picture data for the terminal apparatus 14.

Print job data includes print data based on which to perform printing and setting information. For example, the print data is data in which drawing commands for drawing of an image(s) of one of more pages to be printed are written in a page description language (PDL). Examples of the page description language are Post Script (registered trademark) and PDF (Portable Data Format). Naturally, the page description language may be data of another format (e.g., Art format data). In the following description, print data that is written in the page description language will be referred to as "PDL data."

The setting information of print job data includes plural attribute information, which indicate attributes of the print job such as a color/monochrome setting (e.g., color-mode printing or monochrome-mode printing), a post-handling setting (e.g., presence/absence of post-handling), a sheet kind (e.g., sheet size, weight, type, and color), and the number of sheets that are necessary for execution of the print job. Naturally, the attributes of a print job may include other attributes. For example, the attributes of a print job may include, as basic setting attributes, the number of copies, a double-sided/single-sided printing setting, a spool option, a printer mode (e.g., continuous gradation or screen), a sheet tray setting, a document page range setting, etc.

The attributes of a print job may include, as sheet/page attributes, sheet settings, presence/absence of sheet insertion, presence/absence of special pages, etc. The attributes of a print job may include a rasterization type. The attributes of a print job may include, as output method (printing method) attributes, layout settings, insertion printing settings, presence/absence of a memo, presence/absence of page numbers, presence/absence of insertion of a watermark, a magnification adjustment, etc. The attributes of a print job may include, as color printing attributes, RGB settings, CMYK settings, special color settings, etc.

The attributes of a print job may include, as post-handling attributes, an ejection surface setting, an ejection destination setting, a punching setting, a sheet folding setting, a cutting setting, etc. Furthermore, the attributes of a print job may include image quality attributes and pre-handling attributes.

The printers 12 are apparatus for performing printing on recording media such as sheets. Each printer 12 is equipped with a data processing device (e.g., DFE (digital front end) device). The data processing device, which is equipped with an RIP (raster image processor) is a device for converting PDL data (print data) received from the job managing apparatus 10 into of a raster-form (e.g., bitmap-form) image data (raster image data) by performing rasterization processing on the PDL data. Instead of converting PDL data directly into raster image data, the data processing device may convert PDL data into intermediate-language-form data (intermediate data) and then converting the intermediate data into raster image data.

Each printer 12 prints an image on a recording medium on the basis of raster image data. Each printer 12 is equipped with a print engine of an electrophotographic type, an inkjet type, or the like. Each printer 12 is what is called a production printer, for example. The printers 12A, 12B, . . . , 12N may be of either the same type or different types.

The terminal apparatus 14 is a personal computer (PC), a tablet PC, a smartphone, a cell phone, or a like apparatus. The terminal apparatus 14 accesses the job managing apparatus 10 using a web browser or the like, receives management picture data (management UI data; mentioned above) from the job managing apparatus 10, and displays its management picture. ISS (Internet Information Services) or the like is used for this purpose.

At the installation place of the terminal apparatus 14, an operator selects a print job and a transmission destination printer 12 through the management picture. As soon as the operator selects a print job and a transmission destination printer 12, the job managing apparatus 10 sends the selected print job data to the transmission destination printer 12. The printer 12 performs printing according to the received print job data.

The printing system will be described below in detail.

Figure 2:
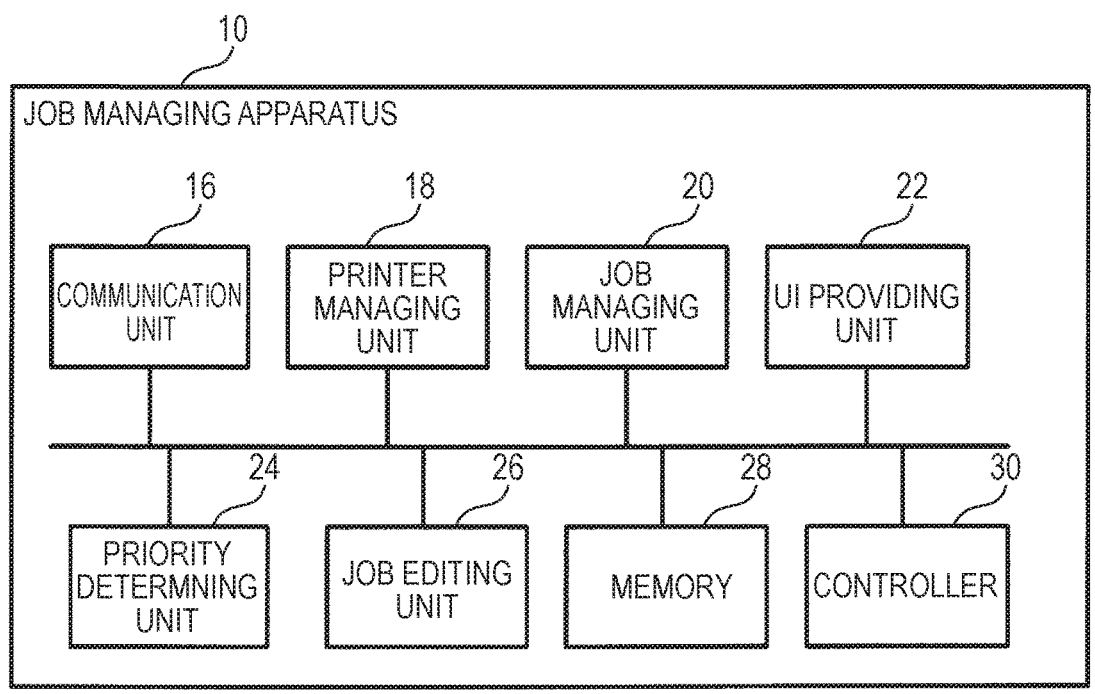
FIG. 2 is a block diagram of a job managing apparatus according to the exemplary embodiment.

The configuration of the job managing apparatus 10 will be described in detail with reference to FIG. 2. FIG. 2 shows the configuration of the job managing apparatus 10.

A communication unit 16, which is a communication interface, has a function of sending data to another apparatus and a function of receiving data from another apparatus. For example, the communication unit 16 has a wireless communication function and/or a wired communication function and has a function of sending and receiving data over a communication path such as a LAN or the Internet.

A printer managing unit 18 has a function of managing the individual printers 12. The printer managing unit 18 acquires printer information (e.g., information indicating characteristics, states, etc. of the printer) from each printer 12 regularly or with prescribed timing and stores the acquired printer information in a memory 28. The printer managing unit 18 updates the printer information stored in the memory 28 every time it acquires new printer information from each printer 12. The printer managing unit 18 functions as an example of the "storage control unit".

The printer information includes plural pieces of attribute information (i.e., information indicating an attribute) of each printer 12. The attributes of each printer 12 are an operation state (e.g., down, stopped, stopped due to an abnormality, or unknown) of the printer 12, presence/absence of a color printing function, presence/absence of a post-handling function, a kind of sheets set in the printer 12 (e.g., sheet size, weight, type, and color), an amount of sheets set in the printer 12, an amount of toner set in the printer 12, an estimated end time of an uncompleted print job, an installation place of the printer 12, a failure rate of the printer 12, etc. Naturally, the attributes of each printer 12 may include other attributes.

A job managing unit 20 has a function of managing print jobs received from external apparatus. For example, the job managing unit 20 temporarily stores (spools) print job data in the memory 28. The job managing unit 20 has a function of sending data of a print job selected by an operator to a printer 12 selected by the operator. The job managing unit 20 functions as an example of the "storage control unit".

A UI providing unit 22 has a function of generating management picture data (management UI data) for selection of print job and a printer 12 and providing the generated management picture data for the terminal apparatus 14. The management picture is a picture including a print job list that is a list of print jobs being managed by the job managing apparatus 10 and a printer list that is a list of the printers 12 being managed by the job managing apparatus 10. For example, the print job list and the printer list are displayed simultaneously in the same management picture. The management picture data is in the forms of a web page, for example; in the terminal apparatus 14, a management picture is displayed using a web browser.

An operator selects a print job from the print job list through the management picture being displayed in the terminal apparatus 14 and selects, from the printer list, a printer 12 to which the selected print job data is to be sent. As soon as a print job and a printer 12 are selected, the selected print job data is sent to the selected printer 12 and printing is performed by the selected printer 12 according to the selected print job data. The UI providing unit 22 functions as an example of the "display control unit".

As soon as a print job is selected by an operator through the management picture, the UI providing unit 22 changes the display order of the printers 12 in the printer list using the setting information of the selected print job and the pieces of printer information of the respective printers 12. For example, the UI providing unit 22 changes the display order of the printers 12 according to priority ranks that are determined by a priority determining unit 24 (described later). The display order of the printers 12 will be described below in detail.

The priority determining unit 24 determines priority ranks of the respective printers 12 using the setting information of a print job selected by an operator and the pieces of printer information of the respective printers 12. For example, the priority determining unit 24 calculates the degrees of conformity (judgment values) between a print job selected by an operator and each printer 12 for the respective attributes of the printer 12, and determines a priority rank of each printer 12 on the basis of the calculation results. The priority determining unit 24 may calculate the degrees of conformity using weight coefficients that are set for the respective attributes. The weight coefficients may be changed by an operator.

The priority determining unit 24 may determine priority ranks of the respective printers 12 by two-step processing. In this case, in the first-stage processing, the priority determining unit 24 excludes printers 12 that are not suitable for a print job selected by an operator. For example, the priority determining unit 24 excludes printers 12 that are not suitable for a print job selected by an operator in terms of a particular one(s) of the attributes. The particular attribute(s) may be changed by an operator. In the second-stage processing, the priority determining unit 24 determines priority ranks of the respective printers 12 other than the excluded ones using the setting information of the print job selected by the operator and the pieces of printer information of those printers 12.

As soon as the priority determining unit 24 determines priority ranks of the respective printers 12, the UI providing unit 22 changes the display order of the printers 12 in the printer list according to the thus-determined priority ranks of the respective printers 12. The UI providing unit 22 may cause printers 12 that have been excluded by the first-stage processing to be displayed differently in the printer list than printers 12 that have not. For example, the UI providing unit 22 may display printers 12 that have been excluded by the first-stage processing in grayed-out form; the background of the information indicating each excluded printer 12 is displayed in gray color or the like and the operator's manipulation of selecting an excluded printer 12 is rendered invalid (e.g., not accepted). For another example, the UI providing unit 22 may abstain from displaying, in the printer list, printers 12 that have been excluded by the first-stage processing.

A job editing unit 26 has a function of editing the setting information of a print job that has been selected by an operator. The edited setting information of the print job is stored in the memory 28.

The memory 28 is a storage device such as a hard disk drive and stores print job data, pieces of printer information, various kinds of data, various programs, etc.

A controller 30 has a function of controlling the individual units of the job managing apparatus 10. The controller 30 functions as the "receiving unit".

The job managing apparatus 10 may perform what is called prepress processing (e.g., processing including pagination processing). Naturally, the prepress processing may be performed by an external apparatus.

Figure 3:
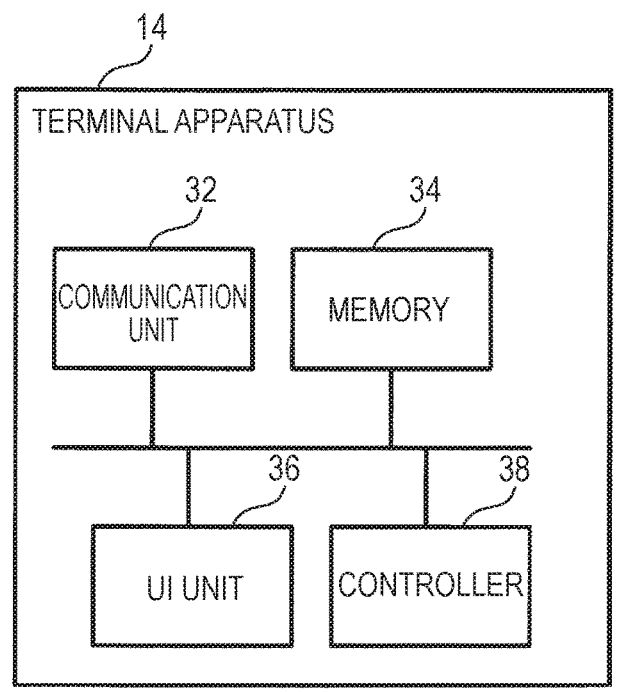
FIG. 3 is a block diagram of a terminal apparatus.

The configuration of the terminal apparatus 14 will be described below in detail with reference to FIG. 3. FIG. 3 shows the configuration of the terminal apparatus 14.

A communication unit 32, which is a communication interface, has a function of sending data to another apparatus and a function of receiving data from another apparatus. For example, the communication unit 32 has a wireless communication function and/or a wired communication function and has a function of sending and receiving data over a communication path such as a LAN or the Internet.

A storage unit 34 is a storage device such as a hard disk drive and stores various kinds of data, various programs such as a web browser program, address information of the job managing apparatus 10, etc.

A UI (user interface) unit 36 includes a display and a manipulation unit. The display is a display device such as a liquid crystal display. The manipulation unit is an input device such as a touch panel, a keyboard, and/or a mouse. Naturally, a device that is equipped with both of the display and the manipulation unit may be used as the UI unit 36.

A controller 38 controls the operations of the individual units of the terminal apparatus 14. The controller 38 causes the UI unit 36 to display the management picture that is provided by the job managing apparatus 10.

The terminal apparatus 14 is used in selecting a print job and a printer 12. An operator selects a print job and a printer 12 to which the print job data is to be sent through the management picture being displayed in the UI unit 36 of the terminal apparatus 14. Printing is performed by the printer 12 selected by the operator according to the print job selected by the operator. The setting information of a print job may be edited using the terminal apparatus 14.

Figure 4:
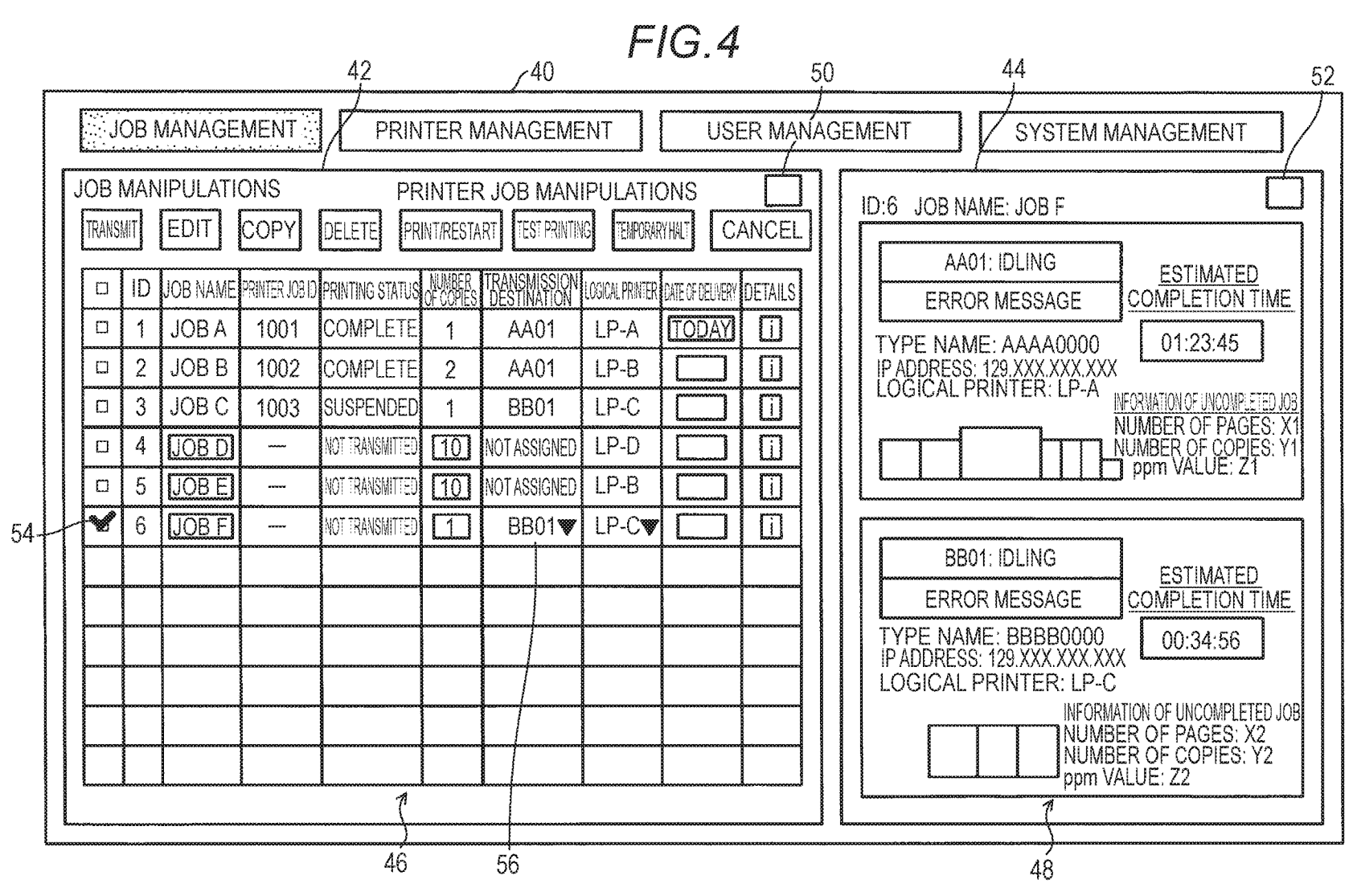

The management picture that is provided by the UI providing unit 22 will be described below in detail with reference to FIG. 4. FIG. 4 shows an example management picture.

A management picture 40 is supplied from the job managing apparatus 10 to the terminal apparatus 14 and displayed in the UI unit 36 of the terminal apparatus 14. The management picture 40 includes a job list display area 42 and a printer list display area 44. A job list 46 is displayed in the job list display area 42 and a printer list 48 is displayed in the printer list display area 44. The job list 46 and the printer list 48 are displayed simultaneously in the same management picture 40.

The job list 46 is a list of print jobs being managed by the job managing apparatus 10. More specifically, the job list 46 correlates an ID, a job name, a printer job ID, information indicating a printing status, the number of copies, information indicating a transmission destination printer 12 (e.g., printer name), a logical printer name, and information indicating a date of delivery of a printed product.

The ID is information for management of the print job in the job list 46. The job name is a name of the print job. The printer job ID is information for management of the print job in a printer 12. The printing status is a status of the print job. For example, a character string "complete" is displayed in the printing status column if printing according to the print job has been completed, a character string "suspended" is displayed in the printing status column if the print job is suspended currently, and a character string "not sent" is displayed in the printing status column if the print job has not been sent to a printer 12 yet.

In the example shown in FIG. 4, six print jobs are displayed in the job list 46. Naturally, the UI unit 36 may be configured so that the display area of the job list 46 can be varied by a scroll bar manipulation, a page movement instruction, or the like if not all of the job list 46 can be displayed in one picture.

For example, as for the print job whose ID is "6," its name is "Job F," its data has not been sent to any printer 12 yet, and the number of copies is "1." A printer "BB01" is selected as a transmission destination printer 12, a logical printer "LP-C" is selected, and no date of delivery is specified.

A transmit button image, an edit button image, a copy button image, and a delete button image for job manipulations are displayed in the job list display area 42. If a print job and a transmission destination printer 12 are selected by an operator through the job list 46 and the transmit button image is pushed by the operator, data of the print job selected by the operator is transmitted from the job managing apparatus 10 to the printer 12 selected by the operator.

If a print job is selected by an operator and the edit button image is pushed by the operator, a picture (edit picture) through which to edit the setting information of the selected print job is displayed in the UI unit 36 of the terminal apparatus 14. The operator gives an edit instruction that is directed to the setting information, and the job editing unit 26 edits the setting information according to the edit instruction. If an operator pushes the copy button image, data of a selected print job is copied. If an operator pushes the delete button image, the selected print job is deleted from the job list 46.

A print/restart button image, a test printing button image, a temporary halt button image, and a cancel button image for printer job manipulations are displayed in the job list display area 42. If one of these buttons is manipulated by an operator, printing, a restart of printing, test printing, a halt of printing, cancellation of printing, or the like is performed or caused according to the manipulated button image.

An update button image 50 is displayed in the job list display area 42. If the update button image 50 is pushed by an operator, the job list 46 is updated and an updated job list 46 is displayed in the job list display area 42. For example, if the update button image 50 is pushed by an operator in a case that the job managing apparatus 10 has received a new print job after display of a job list 46, the job list 46 is updated and an updated job list including the new print job is displayed in the job list display area 42. Naturally, the job list 46 may be updated automatically. For example, the job list 46 may be updated when the job managing apparatus 10 receives a new print job or on a regular basis. Update processing is performed by the UI providing unit 22.

The printer list 48 is a list of the printers 12 being managed by the job managing apparatus 10. In the example shown in FIG. 4, information relating to a printer 12 having a printer name "AA01" and information relating to a printer 12 having a printer name "BB01" are displayed in the printer list 48. Naturally, the UI unit 36 may be configured so that the display area of the printer list 48 can be varied by a scroll bar manipulation, a page movement instruction, or the like if not all of the printer list 48 can be displayed in one picture.

Information to be displayed in the printer list 48 will described below in detail. For example, a printer name, information indicating a status, an error message, information indicating a printer type, information indicating an IP address, a logical printer name, an estimated completion time (estimated end time) of a print job whose data has already been transmitted, information relating to the uncompleted print job, etc. are displayed in the printer list 48 for each printer 12.

A detailed description will be made of information that is displayed in the printer list 48 for the printer 12 having the printer name "AA01." This printer 12 is in an idling state and the estimated completion time of a print job whose data has already been transmitted to it is "1 hr 23 min 45 sec." The number of pages, the number of copies, and a ppm (pages per minute) value are displayed as information relating to the uncompleted print job of this printer 12.

An estimated completion time is calculated on the basis of a processing ability of a printer 12, the details of an uncompleted print job to be or being carried out by the printer 12, and other factors. For example, the estimated completion time is a time obtained by dividing a total number of surfaces (=(number of pages)×(number of copies)) specified in a print job by a ppm value. An estimated completion time may be calculated by either the job managing apparatus 10 or a data processing device or the like installed in the printer 12.

The error message is information indicating a printer communication error, detection of printer power off, opening of a cover, a sheet jam, opening of a stacker door, opening of a front cover, opening of a sheet tray, full loading of a sheet ejection destination, a spool capacity being in full use, toner being used up, no sheet remaining, or the like. A status of the printer 12 is detected on the basis of printer information that is acquired from it and, if the printer 12 is in an erroneous state, an error message indicating the error is displayed.

An update button image 52 is displayed in the printer list display area 44. If the update button image 52 is pushed by an operator, the printer list 48 is updated and an updated printer list 48 is displayed in the printer list display area 44. The status of each printer 12, the number of print jobs to be carried out by each printer 12, the amounts of toner and sheets existing in each printer 12, and other things vary as time elapses. These pieces of information are included in printer information that is acquired from each printer 12. The printer information of each printer 12 stored in the memory 28 is updated by the printer managing unit 18's acquiring printer information from each printer 12 regularly or with prescribed timing. If the update button image 52 is pushed by an operator, the printer list 48 is updated, that is, a new printer list 48 is displayed in the printer list display area 44 according to the update printer information.

The printer managing unit 18 may acquire printer information from each printer 12 in response to an operator's pushing the update button image 52. Naturally, the printer list 48 may be updated automatically. For example, the printer list 48 may be updated automatically every time printer information is received. Update processing is performed by the UI providing unit 22.

A job management button image, a printer management button image, a user management button image, and a system management button image are displayed in the management picture 40. If the job management button image is pushed by an operator, a job list 46 and a printer list 48 are displayed in the management picture 40. If the printer management button image is pushed by an operator, pieces of information for management of the printers 12 are displayed in the management picture 40. If the user management button image is pushed by an operator, information for management of users is displayed in the management picture 40. If the system management button image is pushed by an operator, information for management of the printing system is displayed in the management picture 40.

If a print job is selected from the job list 46 by an operator, the UI providing unit 22 changes the display order of the printers 12 in the printer list 48 using the setting information of the selected print job and the pieces of printer information of the respective printers 12. For example, the UI providing unit 22 displays the printers 12 in the printer list 48 in such a manner that a printer 12 whose attributes are more suitable for the attributes of the selected print job is displayed as a printer 12 that is higher in priority, for example, displayed at a higher rank position. More specifically, the UI providing unit 22 changes the display order of the printers 12 according to priority ranks that are determined using the setting information of the selected print job and the pieces of printer information of the respective printers 12. The processing of changing the display order according to priority ranks will be described later in detail.

A check box corresponding to each print job is displayed in the job list 46. If a check box is manipulated by an operator, the print job corresponding to the manipulated check box is selected. If a check box is manipulated by an operator in a state that the print job corresponding to that check box is already selected, the selection of the print job is canceled. More specifically, if an operator designates a check box corresponding to an unselected print job by manipulating the mouse cursor, the print job corresponding to the designated check box is selected. If an operator designates a check box corresponding to a currently selected print job by manipulating the mouse cursor, the selection of the print job corresponding to the designated check box is canceled.

For example, if an operator manipulates the check box corresponding to the print job whose ID is "6," the print job whose ID is "6" is selected. In this case, the UI providing unit 22 causes a printer 12 whose attributes are more suitable for the attributes of the print job whose ID is "6" to be displayed in the printer list 48 as a printer 12 that is higher in priority. For example, if the attributes of the printer "AA01" are more suitable for those of the print job whose ID is "6" than those of the printer "BB01" are, the printer "AA01" is displayed with higher priority (i.e., at a higher rank position) than the printer "BB01."

The UI providing unit 22 changes the display order of the printers 12 in the printer list 48 with such timing that a print job has been selected by an operator. If a print job is selected by an operator again in a state that this the print job is already selected by the user, the UI providing unit 22 does not change (i.e., maintains) the current display order of the printers 12 in the printer list 48.

For example, assume that the print job whose ID is "6" has been selected by an operator and the display order of the printers 12 in the printer list 48 has been changed accordingly. If the user selects the print job whose ID is "6" again in a state it is already selected, the UI providing unit 22 does not change (i.e., maintains) the display order of the printers 12. This measure makes it easier for an operator to select a printer 12 that is suitable for a print job than in a case that the display order of the printers 12 is changed every time the same print job is selected.

The setting information of each print job can be changed through the job list 46. For example, an operator can change the name, the number of copies, the date of delivery, etc. of a print job in a state that it has been selected by the operator. To perform such a changing manipulation, a print job that has already been selected should be selected again by an operator. For example, the operator should designate (select) the currently selected print job by manipulating the mouse cursor (e.g., clicking the mouse in a state that the mouse cursor is placed on the check box of the currently selected print job) and change the setting information of this print job. At this time, the UI providing unit 22 does not respond to the re-selection (re-designation) but maintains the display order of the printers 12 in the printer list 48.

For example, if an operator selects the print job whose ID is "6" again in a state that it is already selected to change its setting information, the UI providing unit 22 does not change (i.e., maintains) the display order of the printers 12 in the printer list 48 that was set using the current setting information of the print job whose ID is "6" and the pieces of printer information of the respective printers 12. Incidentally, the name, the number of copies, the date of delivery of a print job, etc. are an example of the "setting information other than a transmission destination".

On the other hand, if the selection of a selected print job is canceled and another print job is selected by an operator, the UI providing unit 22 changes the display order of the printers 12 in the printer list 48 using the setting information of the newly selected print job and the pieces of printer information of the respective printers 12. For example, if the selection of the print job whose ID is "6" is canceled and the print job whose ID is "5" is newly selected, the UI providing unit 22 changes the display order of the printers 12 in the printer list 48 using the setting information of the print job whose ID is "5" and the pieces of printer information of the respective printers 12.

Figure 5:
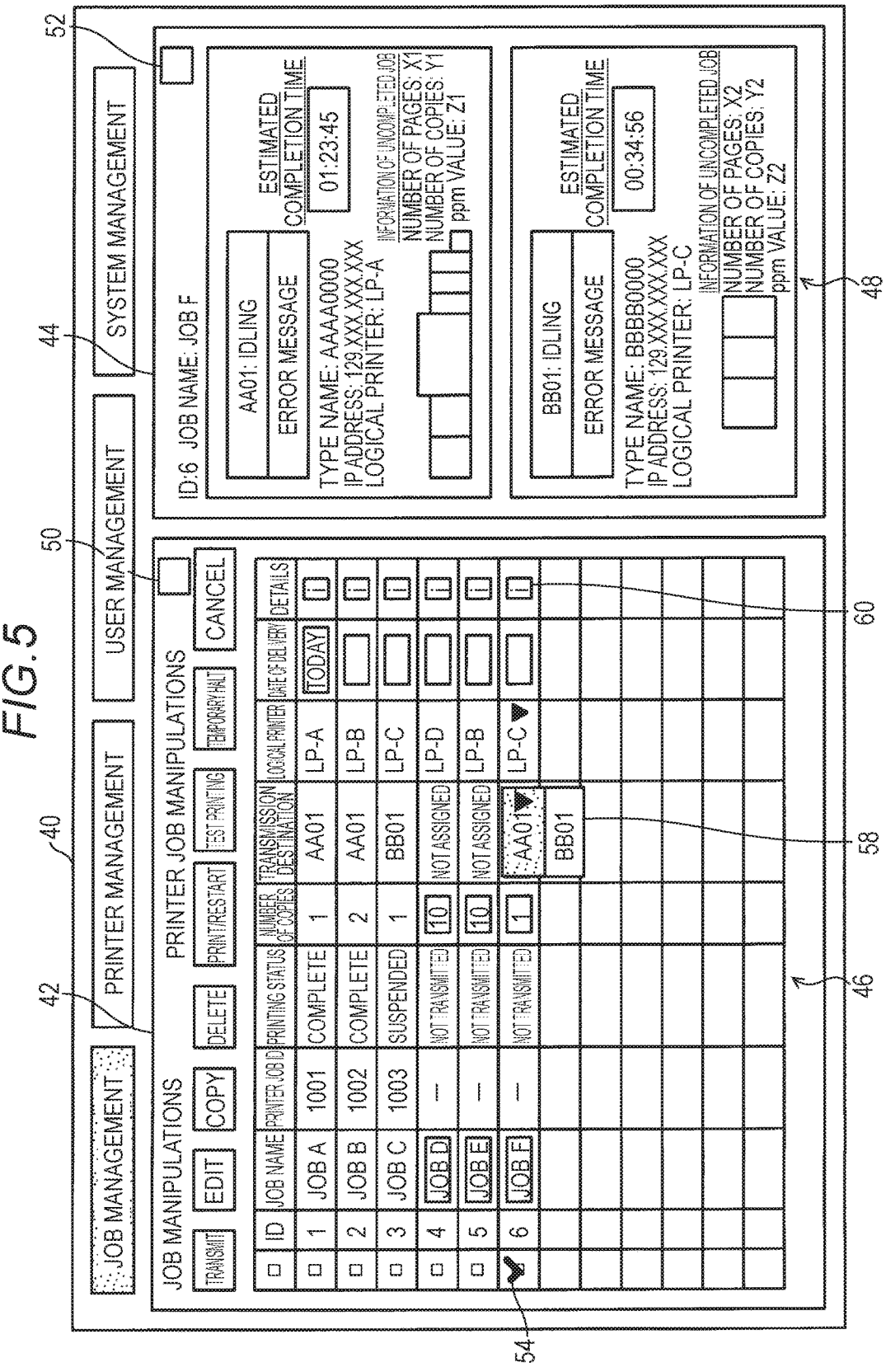
FIG. 5 shows another example management picture.

How the management picture 40 is altered in selecting a transmission destination printer 12 will be described below with reference to FIGS. 4 and 5. FIG. 5 shows another example of the management picture 40.

If a display space (which is an example of the "first printer selection space") for a transmission destination printer 12 is designated in the job list 46 by an operator, the UI providing unit 22 displays a printer list (a list of the printers 12) in the designated display space. In the example of FIG. 4, a display space 56 for a transmission destination printer of the selected printer job whose ID is "6" is currently designated. In this case, as shown in FIG. 5, the UI providing unit 22 displays a printer list 58 (a list of the printers 12) in the display space 56. The printer list 58 is displayed in pull-down form, for example. Naturally, the printer list 58 may be displayed in another display form.

If the operator selects a transmission destination printer 12 from the printers 12 in the printer list 58, the UI providing unit 22 causes the UI unit 36 to display the name of the printer 12 selected by the operator in the display space 56. For example, if the printer "BB01" is selected by the operator, as shown in FIG. 4 the name "BB01" of the printer "BB01" comes to be displayed in the display space 56.

A list of the printers 12 being managed by the job managing apparatus 10 is displayed as the printer list 58. At this time, the UI providing unit 22 causes the display order of the printers 12 in the printer list 58 in the job list display area 42 to reflect the display order of the printers 12 in the printer list 48 being displayed in the printer list display area 44. That is, the printers 12 are displayed in the printer list 58 displayed in the job list display area 42 in the same order as in the printer list 48 displayed in the printer list display area 44. In the example of FIG. 5, the printers "AA01" and "BB01" are displayed in this order in the printer list 48 displayed in the printer list display area 44. Thus, the printers "AA01" and "BB01" are displayed in this order also in the printer list 58 displayed in the job list display area 42.

As described above, the display order of the printers 12 in the printer list 58 displayed in the job list display area 42 is in link with that of the printers 12 in the printer list 48 displayed in the printer list display area 44. This makes it easier for an operator to select a transmission destination printer 12 than in a case that the display order of the printers 12 in the printer list 58 is different from that of the printers 12 in the printer list 48.

If the display space of a transmission destination printer 12 is designated by an operator in a state that the transmission destination printer 12 is already selected, the UI providing unit 22 causes the UI unit 36 to display a printer list in the designated display space. For example, if the display space of a transmission destination printer 12 is designated by an operator for the print job whose ID is "6" in a state that the transmission destination printer 12 is already selected for the print job whose ID is "6," the UI providing unit 22 causes the UI unit 36 to display a printer list 58 in the designated display space 56. In doing so, the UI providing unit 22 causes the display order of the printers 12 in the printer list 58 in the job list display area 42 to reflect the display order of the printers 12 in the printer list 48 being displayed in the printer list display area 44. At this time, the UI providing unit 22 may cause display, in the management picture 40, of information (e.g., message) to the effect that the display order of the printers 12 has been reflected in the printer list 58.

For example, assume that the printer "BB01" has already been selected by an operator as a transmission destination printer 12 for the print job whose ID is "6." If the operator designates the display space 56 in this state, a printer list 58 is displayed in the display space 56 and the display order of the printers 12 in the printer list 58 is made the same as that of the printers 12 in the printer list 48.

The UI providing unit 22 may display the printer list 58 in the job list display area 42 in such a manner that the name of a selected printer 12 and the name(s) of an unselected printer(s) 12 are displayed differently. For example, the discrimination may be made in such a manner that the names of the selected printer "BB01" and the unselected printer "AA01" are displayed in different colors, a selection mark or the like is displayed for the selected printer "BB01," or the names of the selected printer "BB01" and the unselected printer "AA01" are displayed at different positions. This measure makes it easier for an operator to discriminate between a selected printer 12 and an unselected printer(s) 12 than in a case that their names are not displayed differently.

Naturally, the UI providing unit 22 need not always cause the display order of the printers 12 in a printer list 58 in the job list display area 42 to reflect the display order of the printers 12 in the printer list 48 being displayed in the printer list display area 44. In this case, for example, the UI providing unit 22 causes the UI unit 36 to display the selected printer "BB01" preferentially (e.g., at the highest rank position) in the printer list 58 displayed in the job list display area 42. If an operator makes an information update instruction in a state that a printer list 58 is displayed, the UI providing unit 22 may cause the display order of the printers 12 in the printer list 58 to reflect the display order of the printers 12 in the printer list 48.

A printer selection method other than the one described above is possible in which a transmission destination printer 12 is selected by a drag-and-drop manipulation. For example, in a state that an operator has selected a print job from the job list 46 and this selection is maintained, the operator moves an image (e.g., icon) representing the selected print job to the display space of a printer 12 in the printer list 48 by a drag-and-drop manipulation. The movement destination printer 12 is selected as a transmission destination printer 12.

Another selection method is possible in which an operator selects a transmission destination printer 12 directly from the printers 12 contained in the printer list 48. In this case, the operator selects a transmission target print job from the job list 46 and then selects a transmission destination printer 12 from the printer list 48.

Figure 6:
FIG. 6 shows an example of the setting information of a print job.

Processing of displaying the setting information of a print job will be described below with reference to FIG. 6. For example, if an operator makes an instruction to display the setting information of a certain print job through the job list 46 shown in FIG. 5, the setting information of this print job is displayed in the UI unit 36 of the terminal apparatus 14. For example, if an operator pushes a details button image 60 that is correlated with the print job whose ID is "6" in a state that this print job is selected, the UI providing unit 22 causes the UI unit 36 of the terminal apparatus 14 to display the setting information of the print job whose ID is "6." FIG. 6 shows an example of the setting information (property information) of the print job whose ID is "6." Various kinds of attribute information of the print job whose ID is "6" are displayed.

Figure 8:
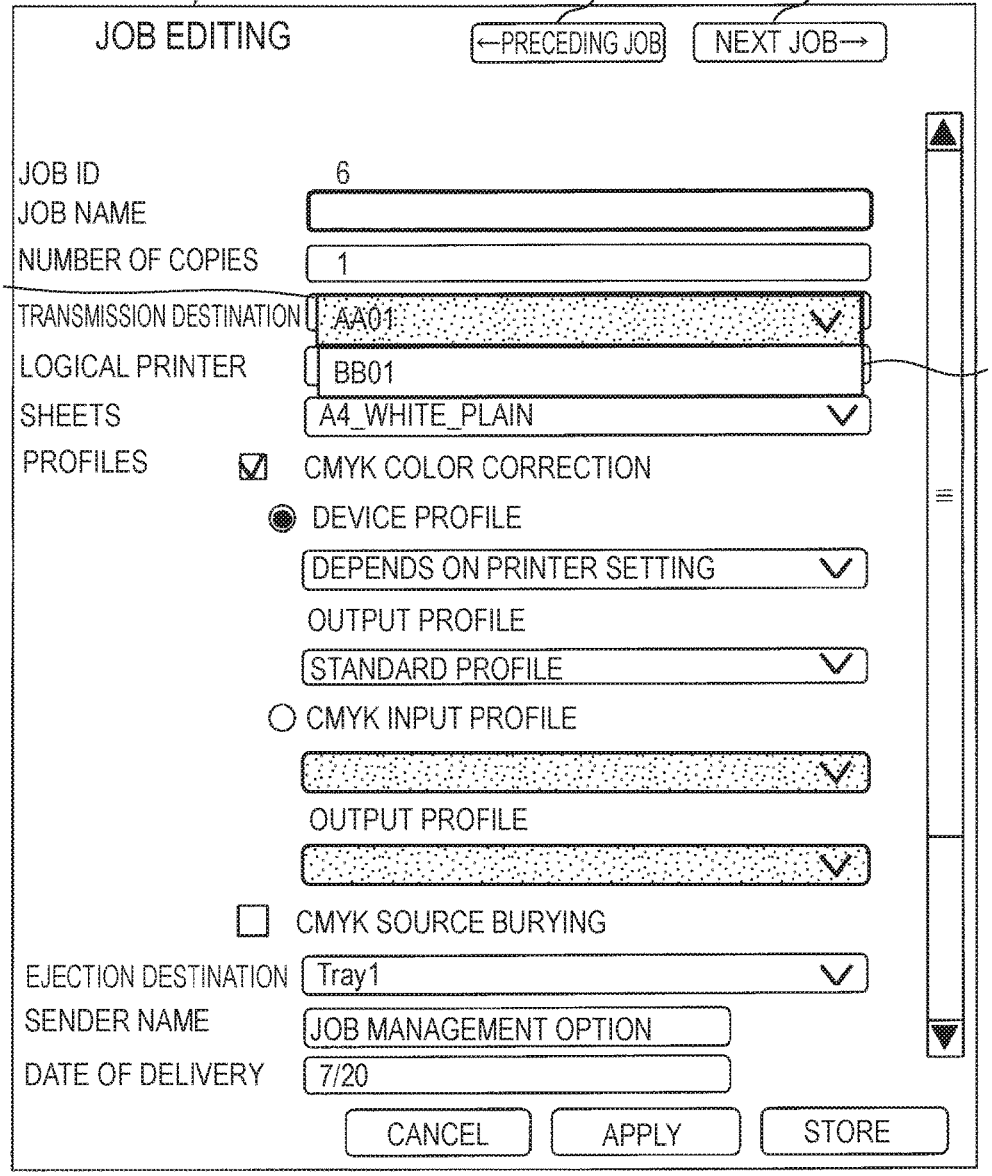
FIG. 8 shows another example print job edit picture.

A print job edit picture (setting picture) will be described below with reference to FIGS. 7 and 8. For example, if an operator selects an edit target print job from the job list 46 and pushes the edit button image, a picture (edit picture) through which to edit the setting information of the selected print job is displayed in the UI unit 36 of the terminal apparatus 14.

FIG. 7 shows an example edit picture 62 in which the print job whose ID is "6" is selected as an edit target print job. The setting information of the print job whose ID is "6" is displayed in the edit picture 62. More specifically, the names of the respective attributes of the print job, edit boxes (e.g., text boxes), etc. are displayed. Where a custom attribute exists, its name, edit box, etc. are also displayed. If an operator gives an edit instruction for the setting information (a piece of attribute information) through the edit picture 62, the job editing unit 26 edits the setting information (the piece of attribute information) of the print job according to the edit instruction. Edited (altered) setting information is stored in the memory 28.

A display box 64 (an example of the "second printer selection space") of the attribute "transmission destination printer" is displayed in the edit picture 62. If the operator selects the display box 64 in the edit picture 62, the UI providing unit 22 causes the UI unit 36 to display a printer list (a list of the printers 12) in the display box 64. For example, as shown in FIG. 8, the UI providing unit 22 causes the UI unit 36 to display a printer list 66 (a list of the printers 12) in the display box 64 in a pull-down form. Naturally, the printer list 66 may be displayed in another form.

If the operator selects a transmission destination printer 12 from the printers 12 contained in the printer list 66, the UI providing unit 22 causes the UI unit 36 to display the name of the printer 12 selected by the operator in the display box 64. For example, if the printer "BB01" is selected by the operator, as shown in FIG. 7 the name "BB01" of the printer "BB01" is displayed in the display box 64.

A list of the printers 12 being managed by the job managing apparatus 10 is displayed in the printer list 66. At this time, the UI providing unit 22 causes the display order of the printers 12 in the printer list 66 in the edit picture 62 to reflect the display order of the printers 12 in the printer list 48 being displayed in the printer list display area 44. That is, the printers 12 are displayed in the printer list 66 displayed in the edit picture 62 in the same order as in the printer list 48 displayed in the printer list display area 44. The display order of the printers 12 in the printer list 48 displayed in the printer list display area 44 is the display order that has been determined using the setting information of the print job (e.g., the print job whose ID is "6") selected as the edit target print job and the pieces of printer information of the respective printers 12, and the display order of the printers 12 in the printer list 66 displayed in the edit picture 62 is made the same as that of the printers 12 in the printer list 48.

In the example shown in FIG. 4, the names "AA01" and "BB01" of the printers 12 "AA01" and "BB01" are displayed in this order in the printer list 48 displayed in the printer list display area 44. Thus, the names "AA01" and "BB01" of the printers 12 "AA01" and "BB01" are displayed in this order also in the printer list 66 displayed in the edit picture 62. In this manner, the display order of the printers 12 in the printer list 66 displayed in the edit picture 62 is in link with that of the printers 12 in the printer list 48 displayed in the printer list display area 44. This measure makes it easier for an operator to select a transmission destination printer 12 than in a case that the display order of the printers 12 in the printer list 66 is different from that of the printers 12 in the printer list 48.

If the display box 64 of a transmission destination printer 12 is designated by an operator in a state that the transmission destination printer 12 is already selected, the UI providing unit 22 causes the UI unit 36 to display a printer list in the designated display box 64. In doing so, the UI providing unit 22 causes the display order of the printers 12 in the printer list 66 in the edit picture 62 to reflect the display order of the printers 12 in the printer list 48 being displayed in the printer list display area 44. At this time, the UI providing unit 22 may cause display, in the edit picture 62, of information (e.g., message) to the effect that the display order of the printers 12 has been reflected in the printer list 66.

For example, assume that the printer "BB01" has already been selected by an operator as a transmission destination printer 12 for the print job whose ID is "6." If the operator designates the display box 64 in this state, a printer list 66 is displayed in the display box 64 and the display order of the printers 12 in the printer list 66 is made the same as that of the printers 12 in the printer list 48.

The UI providing unit 22 may display the printer list 66 in the edit picture 62 in such a manner that the name of a selected printer 12 and the name(s) of an unselected printer(s) 12 are displayed differently. For example, the discrimination may be made in such a manner that the names of the selected printer "BB01" and the unselected printer "AA01" are displayed in different colors, a selection mark or the like is displayed for the selected printer "BB01," or the names of the selected printer "BB01" and the unselected printer "AA01" are displayed at different positions. This measure makes it easier for an operator to discriminate between a selected printer 12 and an unselected printer(s) 12 than in a case that their names are not displayed differently.

Naturally, the UI providing unit 22 need not always cause the display order of the printers 12 in a printer list 66 in the edit picture 62 to reflect the display order of the printers 12 in the printer list 48 being displayed in the printer list display area 44. In this case, for example, the UI providing unit 22 causes the UI unit 36 to display the selected printer "BB01" preferentially (e.g., at the highest rank position) in the printer list 66 displayed in the edit picture 62. If an operator makes an information update instruction in a state that a printer list 66 is displayed, the UI providing unit 22 may cause the display order of the printers 12 in the printer list 66 to reflect the display order of the printers 12 in the printer list 48.

If plural print jobs are selected by an operator as edit targets from the job list 46 and the edit button image is pushed by the operator, the pieces of setting information of the respective print jobs are made editable individually through the edit picture 62. A button image 68 for selecting the preceding print job and a button image 70 for selecting the next print job are displayed in the edit picture 62. When the operator pushes the button image 68 or 70, the actual edit target print job is switched between the plural selected print jobs and the setting information of the resulting edit target print job is displayed in the edit picture 62.

When the actual edit target print job has been changed, the UI providing unit 22 changes the display order of the printers 12 in the printer list 66 in the edit picture 62 according to the resulting print job. That is, the UI providing unit 22 causes the UI unit 36 to display the printers 12 in the printer list 66 displayed in the edit picture 62, in display order that is determined using the setting information of the resulting print job and the pieces of printer information of the respective printers 12. Furthermore, the UI providing unit 22 changes the display order of the printers 12 in the printer list 48 in the printer list display area 44 so that it is made the same as that of the printers 12 in the printer list 66.

For example, assume that the print job whose ID is "5" and the print job whose ID is "6" are selected as edit target print jobs. Where the print job whose ID is "5" is selected actually and its setting information is displayed in the edit picture 62, the printers 12 are displayed in the printer list 66 in display order that is determined using the setting information of the print job whose ID is "5" and the pieces of printer information of the respective printers 12. If the actual edit target is changed to the print job whose ID is "6," the printers 12 are displayed in the printer list 66 in display order that is determined using the setting information of the print job whose ID is "6" and the pieces of printer information of the respective printers 12.

Where a single print job is kept selected as an edit target (i.e., switching between edit target print jobs is not made), the UI providing unit 22 maintains the display order of the printers 12 in the printer list 66 displayed in the edit picture 62 and the display order of the printers 12 in the printer list 48 displayed in the printer list display area 44.

An update button image may be displayed in the edit picture 62. When the update button image is pushed by an operator, the printer list 66 displayed in the edit picture 62 is updated and an updated printer list 66 is displayed in the edit picture 62. As mentioned above, the status etc. of each printer 12 vary as time elapses and its printer information is updated accordingly. When the update button image in the edit picture 62 is pushed, the UI providing unit 22 causes the UI unit 36 to display the printers 12 in the printer list 66 in display order that is determined using the setting information of the edit target print job and the updated pieces of printer information. Naturally, the printer list 66 may be updated automatically. For example, the printer list 66 may be updated automatically every time printer information is acquired. This update processing is performed by the UI providing unit 22.

If the setting information of a print job is altered by an operator, the UI providing unit 22 changes the display order of the printers 12 in the printer list 66 to be displayed in the edit picture 62 and the display order of the printers 12 in the printer list 48 to be displayed in the printer list display area 44 according to the alteration. That is, the UI providing unit 22 causes the UI unit 36 to display the printers 12 in the printer lists 48 and 66 in display order that has been determined using the altered setting information and the pieces of printer information of the respective printers 12.

The UI unit 36 may be configured so that the display area of the setting information can be varied by a scroll bar manipulation, a page movement instruction, or the like if not all of the setting information of the print job can be displayed in the edit picture 62.

Printer management will be described below with reference to FIG. 9. For example, if the printer management button image shown in FIG. 4 is pushed by an operator, the UI providing unit 22 causes the UI unit 36 to display a printer list 68 in the management picture 40. In the printer list 68, a printer name, information indicating a type of a printer 12, an IP address of the printer 12, a logical printer name, a port number of the printer 12, and a pinning setting space (default setting space) are correlated with each other. A selection button image 70 (pinning selection button image) for selecting a default printer 12 is displayed in the default setting space of each printer 12. If a selection button image 70 is pushed by an operator, the printer 12 corresponding to the selection button image 70 is selected as a default printer 12.

The default printer 12 is displayed at the position of a preset display rank (default display rank) in, for example, the printer list 48 displayed in the printer list display area 44. For example, the default printer 12 is displayed at the highest rank position in the printer list 48.

A cancellation button image 72 (pinning cancellation button image) for canceling the default setting is displayed in the default setting space of the default printer 12. In the example shown in FIG. 9, the printer "AA01" is selected as a default printer 12 and the cancellation button image 72 is displayed in the default setting space of the printer "AA01." If the cancellation button image 72 is pushed by an operator, the default setting of the printer 12 corresponding to the cancellation button image 72 is canceled. Default setting information indicating the default printer 12 is stored in, for example, the memory 28 of the job managing apparatus 10, and the UI providing unit 22 causes the UI unit 36 to display the printer 12 indicated by the default setting information at the position of the default display rank.

Incidentally, a default printer 12 may be set for each operator. For example, a default printer 12 is set for each user who has logged in the job managing apparatus 10 using the terminal apparatus 14. In this case, user identification information (e.g., user ID or user name) and default setting information indicating a default printer 12 are stored in the memory 28 of the job managing apparatus 10 so as to be correlated with each other. The UI providing unit 22 causes the UI unit 36 to display the default printer 12 of each user who has logged in the job managing apparatus 10 at the position of the default display rank.

Priority determining processing that is performed by the priority determining unit 24 will be described below in detail. The priority determining unit 24 determines priority ranks of the respective printers 12 using the setting information of a print job selected by an operator and the pieces of printer information of the respective printers 12. In the priority determining processing, a priority rank of each printer 12 is determined using, as example attributes, an operation state of the printer 12, presence/absence of a color printing function, a kind of sheets (e.g., sheet size, weight, type, and color), an amount of sheets, an amount of toner set in the printer 12, presence/absence of a post-handling function, and an estimated end time of an uncompleted print job. Naturally, other attributes may be used such as an installation place of the printer 12 and a failure rate of the printer 12.

A priority rank of each printer 12 is calculated using values (attribute values) that are quantified versions of the following attributes:

Operation state of printer 12: attribute value (a)

Presence/absence of color printing function: attribute value (b)

Presence/absence of post-handling function: attribute value (c)

Kind of sheets: attribute value (d)

Amount of sheets: attribute value (e)

Amount of toner: attribute value (f)

Estimated end time of uncompleted print job: attribute value (g)

The following attribute values may also be used:

Installation place of printer 12: attribute value (h)

Failure rate of printer 12: attribute value (i)

The attribute value of an attribute of a printer 12 is a value indicating, for the attribute, the degree of conformity (judgment value) between a print job selected by an operator and the printer 12. For example, the degree of conformity between a print job and a printer 12 for an attribute is higher when the attribute value is smaller. The priority determining unit 24 calculates attribute values for each printer 12. That is, the priority determining unit 24 calculates, for each attribute of each printer 12, the degree of conformity (judgment value) between a print job selected by an operator and the printer 12.

The priority determining unit 24 calculates a priority rank judgment value for each printer 12 according to the following equation using the above-mentioned attribute values (a)-(g):

$$\text{(Priority rank judgment value)} = (a)+(b)+(c)+(d)+(e)+(f)+(g).$$

Where the attribute values (h) and (i) are also used, a priority rank judgment value is calculated according to the following equation:

$$\text{(Priority rank judgment value)} = (a)+(b)+(c)+(d)+(e)+(f)+(g)+(h)+(i).$$

The degree of conformity between a print job and a printer 12 is higher when the priority rank judgment value is smaller. The priority determining unit 24 sets the priority rank of a printer 12 higher when its priority rank judgment value is smaller. The UI providing unit 22 causes the UI unit 36 to display the printers 12 in ascending order of priority rank judgment values in the printer list 48 displayed in the printer list display area 44. That is, a printer 12 is displayed at a higher rank position as its priority rank judgment value decreases.

How each attribute value is calculated will be described below in detail. A weight coefficient that is suitable for each attribute is set for the attribute. Each weight coefficient may be changed by an operator.

(Operation State of Printer 12)

A weight coefficient 100 points (pt) is used for the attribute "operation state" of the printer 12. Information indicating an operation state of the printer 12 is acquired from the printer 12 utilizing IPP (Internet Printing Protocol), for example.

If the printer 12 is in any of the following operation states, the operation state attribute value "printer state" is set at 1,000,000 pt:

Down

State unknown

Stopped or stopped due to an abnormality.

When having the attribute value 1,000,000 pt, the printer 12 is excluded from the selection candidate printers. That is, the printer 12 is excluded from the selection candidate printers because the printer 12 is substantially unusable when it is down, its operation state is unknown, or it is stopped.

If the printer 12 is in either of the following states, the attribute value "printer state" is set at 0×100 pt:

Idling

Sleeping.

If the printer 12 is in any of the following states, the attribute value "printer state" is set at 1×100 pt:

Running

Under cleaning-up

Under setting-up or warming-up.

(Color/Monochrome Judgment)

Color/monochrome judgment is made using a weight coefficient 100 pt. Information indicating whether the printer 12 has a color printing function is acquired from the printer 12 utilizing IPP, for example.

If a print job requires color printing and the printer 12 does not have a color printing function, the color printing attribute value "printer type" is set at 1×100 pt.

In cases other than the above, the attribute value "printer type" is set at 0×100 pt.

(Post-Handling Judgment)

Post-handling judgment is made using a weight coefficient 50 pt. Information indicating whether the printer 12 has a post-handling device is acquired from the printer 12 utilizing SNMP (Simple Network Management Protocol).

If the post-handling device provided in the printer 12 has a function that is suitable for post-handling required by a print job, the post-handling attribute value "finisher" is set at 0×50 pt. For example, if post-handling required by a print job is binding and the printer 12 is provided with a post-handling device having a binding function, the post-handling attribute value "finisher" is set at 0×50 pt.

If the post-handling device provided in the printer 12 has no function that is suitable for post-handling required by a print job, the post-handling attribute value "finisher" is set at 1×50 pt. For example, if post-handling required by a print job is binding and the printer 12 is not provided with a post-handling device having a binding function, the post-handling attribute value "finisher" is set at 1×50 pt.

(Kind of Sheets)

A weight coefficient 100 pt is used for the attribute "kind of sheets" (e.g., sheet size, weight, type, and color). Information indicating a kind of sheets that are set in the printer 12 is acquired from the printer 12 utilizing IPP, SNMP, XBDS, or the like.

If the size of sheets that are set in the printer 12 is not suitable for a sheet size required by a print job, the sheet kind attribute value "stock" is set at 1,000,000 pt. When having the attribute value 1,000,000 pt, the printer 12 is excluded from the selection candidate printers. That is, the printer 12 is excluded from the selection candidate printers because the printer 12 is substantially unusable when the size of sheets that are set in the printer 12 is not suitable for a sheet size required by a print job.

If the kind of sheets that are set in the printer 12 (e.g., sheet size, weight, type, and color) is suitable for a sheet kind required by a print job, the attribute value "stock" is set at 0×100 pt.

If the size of sheets that are set in the printer 12 is suitable for a sheet size required by a print job but the weight, type, or color of sheets that are set in the printer 12 are not suitable for a sheet weight, type, or color required by the print job, the attribute value "stock" is set at 1×100 pt.

(Sheet Amount Judgment)

Sheet amount judgment is made using a weight coefficient 100 pt. Information indicating an amount of sheets that are set in the printer 12 is acquired from the printer 12 utilizing IPP, SNMP, XBDS, or the like.

The amount of sheets that are set in the printer 12 is sufficiently larger than a sheet amount required by a print job (e.g., the amount A1 of sheets that are set in the printer 12 is larger than a sheet amount A2 required by a print job (A1>A2) and the difference between the sheet amounts A1 and A2 ($\Delta A = A1 - A2$) is larger than or equal to a preset threshold value Ath), the sheet amount attribute value "paper" is set at 0×100 pt.

If the sheet amount A1 is larger than the sheet amount A2 only slightly (e.g., the sheet amount A1 is larger than or equal to the sheet amount A2 (A1≥A2) and the difference $\Delta A$ is smaller than the threshold value Ath), the sheet amount attribute value "paper" is set at 0.5×100 pt.

If the amount of sheets that are set in the printer 12 is smaller than a sheet amount required by a print job (i.e., the sheet amount A1 is smaller than the sheet amount A2 (A1<A2), the sheet amount attribute value "paper" is set at 1×100 pt.

(Toner Amount Judgment)

Toner amount judgment is made using a weight coefficient 100 pt. Information indicating an amount of toner that is set in the printer 12 is acquired from the printer 12 utilizing IPP, SNMP, XBDS, or the like.

If the amount of toner that is set in the printer 12 is sufficiently larger than a toner amount required by a print job (e.g., the amount B1 of toner that is set in the printer 12 is larger than a toner amount B2 required by a print job (B1>B2) and the difference between the toner amounts B1 and B2 ($\Delta B = B1 - B2$) is larger than or equal to a preset threshold value Bth), the toner amount attribute value "toner" is set at 0×100 pt.

If the toner amount B1 is larger than the toner amount B2 only slightly (e.g., the toner amount B1 is larger than or equal to the toner amount B2 (B1≥B2) and the difference $\Delta B$ is smaller than the threshold value Bth), the attribute value "toner" is set at 0.5×100 pt.

If the amount of toner that is set in the printer 12 is smaller than a toner amount required by a print job (i.e., the toner amount B1 is smaller than the toner amount B2 (B1<B2)), the attribute value "toner" is set at 1×100 pt.

(Estimated End Time of Uncompleted Print Job)

Information indicating an estimated end time of a print job being carried out by the printer 12 is acquired from the printer 12 utilizing IPP, for example. The attribute value of the estimated end time is an estimated time (unit: second, for example).

For example, the estimated end time is a time obtained by dividing a total number of surfaces specified in a print job (=(number of pages)×(number of copies)) by a ppm value. The ppm value is acquired from the printer 12 utilizing IPP, for example. Naturally, ppm values of the respective printers 12 may be acquired in advance. An estimated end time may be calculated on the basis of the number of print jobs.

In the above-described manners, the priority determining unit 24 calculates attribute values indicating the degrees of conformity between a print job selected by an operator and each printer 12 for the respective attributes.

(Procedure of Priority Determining Processing)

The procedure of priority determining processing will be described below. For example, the priority determining unit 24 determines priority ranks of the respective printers 12 by performing two-step processing.

As soon as a certain print job is selected by an operator from the job list 46, the priority determining unit 24 performs first-stage processing, that is, excludes, from priority determination candidates, as output-incapable printers 12, printers 12 that are down, operation-state unknown, or stopped (or stopped due to an abnormality)) or are not provided with sheets having a size that is required by the print job. That is, the priority determining unit 24 excludes, by the first filtering, printers 12 whose priority rank judgment values (the sums of attribute values) are larger than or equal to 1,000,000 pt.

Then the priority determining unit 24 performs second-stage processing, that is, determines priority ranks of the respective printers 12 (output-capable printers 12) other than the printers 12 excluded by the first processing. That is, the priority determining unit 24 calculates priority rank judgment values of printers 12 provided with sheets having the size required by the print job and including ones that are idling, running, under cleaning-up, under setting-up, or sleeping. Then the priority determining unit 24 determines priority ranks of the printers 12 on the basis of their priority rank judgment values, respectively.

The UI providing unit 22 causes the UI unit 36 to display the printers 12 in the printer list 48 displayed in the printer list display area 44 in display order that reflects the priority ranks of the printers 12 that have been determined by the priority determining unit 24. In doing so, the UI providing unit 22 may cause the names of the printers 12 that were excluded in the first-stage processing (e.g., printers 12 whose priority rank judgment values were larger than or equal to the threshold value (e.g., 1,000,000 pt)) to be displayed differently in the printer list 48 than the names of the printers 12 that were not. For example, the UI providing unit 22 may cause the names of the excluded printers 12 in grayed-out form. In a grayed-out display, for example, the background of the information indicating each excluded printer 12 is displayed in gray color or the like; selection of an excluded printer 12 is rendered invalid (i.e., such a selecting manipulation is not accepted). For another example, the UI providing unit 22 may abstain from displaying the excluded printers 12 in the printer list 48.

As described above, according to the exemplary embodiment, the display order of the printers 12 in the printer list 48 is changed using the setting information of a print job and the pieces of printer information of the respective printers 12. This makes it easier for an operator to make a manipulation for selecting a printer 12 suitable for the print job than in a case that the printers 12 are displayed in a preset, fixed display order. Furthermore, when the setting information of a print job has been altered, a manipulation for selecting a printer 12 suitable for the altered print job is easier.

Since printers 12 that have been excluded by first-stage processing are displayed in grayed-out form in the printer list 48 or are not displayed in the printer list 48, at least selection of a transmission destination printer 12 by an operator from output-incapable printers 12 is avoided and a transmission destination printer 12 is selected by the operator from output-capable printers 12. For example, printers 12 that are down, operation-state unknown, or stopped or are not provided with sheets having a size required by a print job are judged as printers 12 that are substantially unusable and hence selection from them by an operator can be avoided. Naturally, printers 12 that should be excluded vary depending on the weight coefficients that are used for calculation of attribute values.

A printer 12 that is designated as a default printer 12 is displayed with highest priority (e.g., at the highest-rank position). With this measure, the default printer 12 is displayed at a particular display position (e.g., at the highest-rank position) irrespective of its priority rank determined by the priority determining unit 24.

The priority determining unit 24 may determine priority ranks of the respective printers 12 by one-step processing. In this case, the priority determining unit 24 performs the above second-stage processing without performing the above first-stage processing. That is, the priority determining unit 24 determines priority ranks of all of the printers 12 on the basis of their priority rank judgment values without excluding printers 12 whose priority rank judgment values are larger than or equal to a threshold value. In this case, the UI providing unit 22 causes the UI unit 36 to display the printers 12 in the printer list 48 in display order that reflects the thus-determined priority ranks. In doing so, the UI providing unit 22 may either cause the printers 12 whose priority rank judgment values are larger than or equal to the threshold value to be displayed in grayed-out form in the printer list 48 or abstain from displaying those printers 12 in the printer list 48.

The job managing apparatus 10 may be configured so that an operator can enable or disable the automatic preferential display function for the printers (i.e., the function of displaying the printers 12 in the printer list 48 according to their priority ranks determined by the priority determining unit 24). If the automatic preferential display function is enabled by an operator, the printers 12 are displayed in display order that reflects priority ranks determined by the priority determining unit 24. If the automatic preferential display function is disabled by an operator, the printers 12 are displayed in a preset display order, for example. A switching button image for effectiveness/ineffectiveness switching of the automatic preferential display function may be displayed in the management picture 40. In this case, effectiveness/ineffectiveness switching of the automatic preferential display function can be made by an operator's pushing the switching button image.

If plural print jobs are selected successively from the job list 46 by an operator (e.g., if a second print job is selected within a preset time from selection of a first print job), the priority determining unit 24 determines priority ranks for a print job that is displayed at a highest-rank position in the job list 46 among these plural print jobs. On the other hand, if plural print jobs are selected from the job list 46 not successively (e.g., at intervals that are longer than a preset time), the priority determining unit 24 determines priority ranks for the last-selected print job. The UI providing unit 22 causes the UI unit 36 to display the printers 12 in display order that reflects the priority ranks determined by the priority determining unit 24.

If a transmission destination printer 12 for a certain print job has already been selected in the job list 46 but is not suitable for this print job, the UI providing unit 22 may display a warning message in the management picture 40, display a warning box in pop-up form in the management picture 40, or display the information indicating the selected printer 12 in a particular display color. A selected printer 12 not being suitable for a print job means, for example, a case that a priority judgment value calculated for the print job and the selected printer 12 is larger than or equal to the threshold value (e.g., 1,000,000 pt). For example, a warning message or the like is displayed with such timing that such a print job has just been selected by an operator. With this measure, an operator can recognize whether an already selected printer 12 is suitable for a print job concerned.

If a transmission destination printer 12 has already been selected for a certain print job and the setting information of the print job has been altered in the edit picture 62 (see FIGS. 7 and 8) to cause a situation that the selected printer 12 is not suitable for the print job, the UI providing unit 22 may display a warning message or a warning box in the edit picture 62, display the information indicating the selected printer 12 in a particular display color, display, in the edit picture 62, a confirmation picture for urging the operator to check whether the alteration of the setting information is appropriate, or display, in the edit picture 62, a printer changing picture for changing the transmission destination printer 12.

For example, the priority determining unit 24 calculates a priority rank judgment value of the selected printer 12 using the altered setting information of the print job and the printer information of the selected printer 12. If the calculated priority rank judgment value is larger than or equal to the threshold value (e.g., 1,000,000 pt), the UI providing unit 22 displays a warning message or the like in the edit picture 62. With this measure, an operator can recognize whether an already selected printer 12 is suitable for a print job concerned whose setting information has been altered.

For example, each of the above-described job managing apparatus 10 and terminal apparatus 14 is implemented through cooperation between hardware and software. More specifically, each of the job managing apparatus 10 and the terminal apparatus 14 is equipped with one or plural processors such as CPUs (not shown). The functions of the individual units of each of the job managing apparatus 10 and the terminal apparatus 14 are realized by reading and running programs that are stored in a storage device (not shown). The programs are stored in the storage device via a recording medium such as a CD or a DVD or a communication path such as a network.

For another example, the individual units of each of the job managing apparatus 10 and the terminal apparatus 14 may be implemented by hardware resources such as a processor and an electronic circuit. Another device such as a memory may also be used. For a further example, the individual units of each of the job managing apparatus 10 and the terminal apparatus 14 may be implemented by a DSP (digital signal processor), an FPGA (field programmable gate array), or the like.

What is claimed is:

1. A printing managing apparatus comprising:
   a memory that stores pieces of setting information of respective print jobs and pieces of information relating to respective printers; and
   at least one hardware processor configured to implement:
      a display control unit that causes a display to display, simultaneously, a print job list that is a list of print jobs and a printer list that is a list of printers; and
      a receiving unit that receives an input to the print job list displayed on the display,
   wherein if the receiving unit receives an input for selecting a print job that is displayed in the print job list, the display control unit changes the display order of the printers in the printer list using the setting information of the selected print job and the pieces of information relating to the respective printers; and
   wherein the receiving unit receives an input for selecting a printer as a transmission destination of data of a print job through a picture that is displayed on the display and reflects the change of the display order,
   wherein the display control unit does not change the display order of the printers in the printer list even if the receiving unit receives an input for selecting the selected print job again, and, if the receiving unit receives an input for selecting another print job that is different from the selected print job, the display control unit changes the display order of the printers in the printer list using the setting information of the other print job and the pieces of information relating to the respective printers,
   wherein the print job list includes a first printer selection space for selection of a printer as a transmission destination of data of the selected print job and spaces in which setting information other than the transmission destination is displayed,
   wherein the other setting information is pieces of information each of which is changed through the print job list in response to reception, by the receiving unit, of an input for changing the piece of information,
   wherein the display control unit does not change the display order of the printers in the printer list even if the receiving unit receives an input for altering the other setting information of the selected print job, and
   wherein if the receiving unit receives an input that points to the first printer selection space for the selected print job, the display control unit causes the display to display a list of printers in the first printer selection space and causes the display order of the printers in the first printer selection space to reflect the display order of the printers in the printer list.

2. The printing managing apparatus according to claim 1, wherein if the receiving unit receives an input that points to the first printer selection space for the selected print job in a case that a transmission destination printer is already selected in the first printer selection space, the display control unit causes the display order of the printers in the first printer selection space to reflect the display order of the printers in the printer list.

3. The printing managing apparatus according to claim 2, wherein the display control unit causes the display to display information to the effect the reflection of the display order of the printer has been made.

4. The printing managing apparatus according to claim 1, wherein:
   the receiving means receives an input for selecting a transmission destination printer from the list of printers displayed in the first printer selection space; and
   if a transmission destination printer is already selected, the display control unit causes the display to display the selected printer and unselected printers differently in the list of printers displayed in the first printer selection space.

5. The printing managing apparatus according to claim 1, wherein:
   if the receiving unit receives, through the print job list, an input as an instruction to display an edit picture for editing of the setting information of the selected print job, the display control unit causes the display to display the edit picture;
   the edit picture includes a second printer selection space for selection of a printer as a transmission destination of data of the selected print job; and
   if the receiving unit receives, through the edit picture, an input that points to the second printer selection space, the display control unit causes the display to display a list of printers in the second printer selection space and causes the display order of the printers in the second printer selection space to reflect the display order of the printers in the printer list.

6. The printing managing apparatus according to claim 5, wherein the display control unit does not change the display order of the printers in the second printer selection space that reflects the display order of the printers in the printer list.

7. The printing managing apparatus according to claim 6, wherein:
   the printing managing apparatus further comprises an information update button; and
   if the information update button is selected, the display control unit changes the display order of the printers in the second printer selection space.

8. The printing managing apparatus according to claim 6, wherein if an edit target print job is changed, the display control unit changes the display order of the printers in the second printer selection space according to the changed print job.

9. The printing managing apparatus according to claim 1, wherein if the setting information of the selected print job is altered, the display control unit changes the display order of the printers in the printer list according to the change of the setting information.

10. A non-transitory storage medium storing a computer-executable program for causing a computer to execute as:
    a storage control unit that stores pieces of setting information of respective print jobs and pieces of information relating to respective printers in a memory;
    a display control unit that causes a display to display, simultaneously, a print job list that is a list of print jobs and a printer list that is a list of printers; and
    a receiving unit that receives an input to the print job list displayed on the display,
    wherein if the receiving unit receives an input for selecting a print job that is displayed in the print job list, the display control unit changes the display order of the printers in the printer list using the setting information of the selected print job and the pieces of information relating to the respective printers; and wherein the receiving unit receives an input for selecting a printer as a transmission destination of data of a print job through a picture that is displayed on the display and reflects the change of the display order, wherein the display control unit does not change the display order of the printers in the printer list even if the receiving unit receives an input for selecting the selected print job again, and, if the receiving unit receives an input for selecting another print job that is different from the selected print job, the display control unit changes the display order of the printers in the printer list using the setting information of the other print job and the pieces of information relating to the respective printers, wherein the print job list includes a first printer selection space for selection of a printer as a transmission destination of data of the selected print job and spaces in which setting information other than the transmission destination is displayed, wherein the other setting information is pieces of information each of which is changed through the print job list in response to reception, by the receiving unit, of an input for changing the piece of information, wherein the display control unit does not change the display order of the printers in the printer list even if the receiving unit receives an input for altering the other setting information of the selected print job, and wherein if the receiving unit receives an input that points to the first printer selection space for the selected print job, the display control unit causes the display to display a list of printers in the first printer selection space and causes the display order of the printers in the first printer selection space to reflect the display order of the printers in the printer list.

\* \* \* \* \*